Patented Oct. 24, 1944

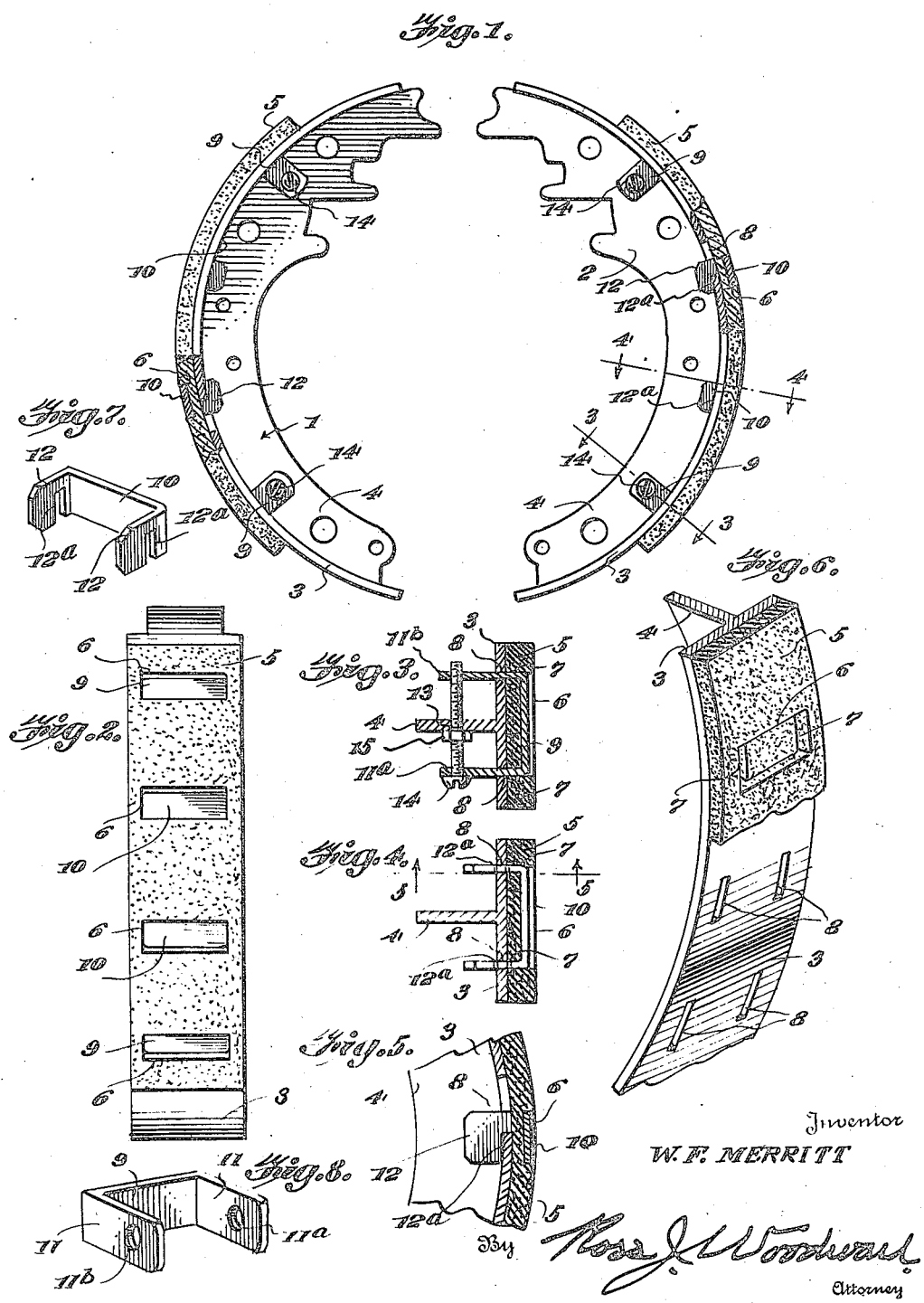

2,361,307

UNITED STATES PATENT OFFICE 2,361,307

DETACHABLE LINING FOR BRAKE SHOES

William F. Merritt, Middletown, N. Y.

Application November 3, 1943, Serial No. 508,843

6 Claims. (Cl. 188—234)

This invention relates to brake linings and it is one object of the invention to provide a lining adapted to be very easily applied to a brake shoe or removed therefrom when renewal is necessary.

Another object of the invention is to provide a lining curved longitudinally for close fit against a brake shoe where it is held by clips which pass through registering openings formed through the lining and the shoe, certain of the clips having interlocking engagement with the shoe and others carrying threaded fasteners which pass through the web of the shoe and prevent the clips and the lining from shifting out of operative engagement with the shoe.

Another object of the invention is to so form the clips that they may have portions countersunk in the brake lining engaging surface of the lining where they will be protected from wear and also prevented from scratching the drum.

Another object of the invention is to so form the clips that a lining equipped therewith may be applied either to a right or left hand shoe of a brake, the clips being also so formed that when the lining is secured to a shoe, pull exerted when the brake is applied, will not tend to shift the clips toward a releasing position.

In the accompanying drawing.

Fig. 1 is a view showing the improved brake shoe and lining principally in side elevation and partially in section.

Fig. 2 is a view looking at the outer face of the shoe and the lining.

Fig. 3 is a transverse sectional view on the line 3—3 of Fig. 1.

Fig. 4 is a transverse sectional view on the line 4—4 of Fig. 1.

Fig. 5 is a fragmentary sectional view on the line 5—5 of Fig. 4.

Fig. 6 is a perspective view showing a portion of the brake shoe and a fragment of the lining.

Fig. 7 is a perspective view of one type of clip used for holding mid-portions of the lining to the brake shoe.

Fig. 8 is a perspective view of another type of clip used for securing ends of the lining to the shoe.

A brake of the type to which this invention refers consists of a drum and a pair of shoes which are pivotally mounted within the drum and swung by brake-applying mechanism in a direction away from each other for gripping engagement with the drum when the brake is applied. Such companion shoes are shown in Fig. 1 of the drawing, and indicated by the numerals 1 and 2. The shoes are of duplicate construction and each has an arcuate rim 3 and a web 4 projecting inwardly from the rim at right angles thereto and extending longitudinally of the rim.

The lining 5 is formed of the customary material used for brake lining and conforms in width and longitudinal curvature to the rim of the shoe. Recesses 6, which extend transversely of the lining strip, are formed adjacent ends thereof and at longitudinally spaced points intermediate its length, and along opposite side edges of the recesses are formed slots 7 for registering with slots 8 formed through the rim 3 and extending longitudinally thereof in spaced relation to its opposite side edges.

In order to detachably secure the lining strip to the shoe there have been provided clips 9 and 10 formed from strips of stiff metal. These clips are U-shaped and formed as shown in Figs. 7 and 8, the clips 9 each having its arms 11 formed with alined openings 11$^a$ and 11$^b$ and each clip 10 having its arms 12 of less length than the arms of the clips 9 and formed with opposed slots 12$^a$ leading from their side edges. The clips 10 are inserted through the intermediate slots before the clips 9 are inserted through the end slots of the lining and the shoe and the metal from which the clips are formed is of such thickness that when the clips are in place, bridge portions of the clips will be countersunk in the recesses 6, as shown clearly in Figs. 3, 4 and 5 of the drawing. Therefore, the clips will not make contact with the brake drum when a brake is applied and scratching of the drum will be avoided and also, the clips will not be worn.

After the clips 10 have been inserted, the lining is shifted longitudinally of the shoe and, since the clips move with the lining, portions of the rim of the shoe at ends of the slots through which the arms of the clips pass, will be engaged in the slots 12$^a$ and the clips prevented from shifting outwardly. Therefore, intermediate portions of the lining will be held tightly against the outer surface of the rim of the shoe. The clips 9 are then passed through the slots near ends of the lining and, when they are pressed firmly into the recesses, the openings 11$^a$ and 11$^b$ of their arms will be alined with threaded openings 13 formed through the web of the shoe and the screw 14 may be passed through the openings 11$^a$ and then threaded through the openings 13 and 11$^b$. Locking nuts 15 are carried by the screws, and when tightened, exert binding action to prevent the screws from working loose. Therefore, the lining will be firmly held against the shoe and cannot accidentally work loose.

Referring to Fig. 1, it will be seen that when the clips 10 are passed through the lining they are so disposed that their slots 12ª face in the direction in which the brake drum turns. Therefore, strain exerted by frictional pull against the linings of the two shoes will tend to hold the clips 10 in interlocked engagement with the shoes. When it is necessary to renew the brake linings the clips 9 are first removed, the linings then shifted longitudinally to free arms of the clips 10 from interlocked engagement with the shoes, and the clips 10 then withdrawn. The linings will thus be freed from the shoes and new linings may be applied and secured by the same clips used for the old linings. Since the U-grooves 6 and the slots are evenly spaced the linings and the clips are interchangeable and may be used for either shoe.

Having thus described the invention, what is claimed is:

1. In a brake structure, a shoe having a rim and a web extending inwardly therefrom, the rim being formed with sets of slots spaced from each other longitudinally of the shoe, the slots of each set being spaced from each other transversely of the shoe, a lining strip disposed against the outer face of the rim of the shoe and extending longitudinally thereof for substantially its full width, said lining having its outer face formed with transversely extending recesses and with slots at opposite sides of the recesses for registering with the slots of the rim, U-shaped clips each having a bridge portion seated in a recess in countersunk relation to the outer surface of the lining and arms passing through companion slots of the lining and the shoe, the clips located intermediate the length of the lining having their arms formed with transverse slots for interlocking engagement with portions of the rim at ends of the slots in the rim through which the arms pass, the clips near ends of the lining having their arms formed with openings alined with threaded openings formed through the web of the shoe, one opening of each of the last mentioned clips being threaded and the other unthreaded, screws passed through the unthreaded openings and threaded through the threaded openings of the clips and the web, and locking nuts carried by the screws and bearing against the web to exert frictional binding and lock the screws against loosening.

2. In combination with a brake shoe having a rim and a web, the rim being formed with sets of transversely spaced slots and the web being formed with openings; a lining disposed against the rim and formed with transverse recesses in its outer face and slots leading from the recesses for registering with the slots of the shoe, U-shaped clips having bridge portions countersunk in the recesses and arms passing through companion slots of the lining and the shoe, the arms of certain of said clips being formed with transverse slits for receiving portions of the rim and effecting interlocking engagement between the clips and the rim to prevent accidental displacement of said clips, other clips having their arms formed with openings alined with openings in the web of the shoe, screws passed through the openings of the web and the arms of the last mentioned clips and each having threaded engagement with the web and one arm of the clip through which it passes, and locking nuts threaded on the screws and engaging the web for exerting binding action and locking the bolts against accidental displacement.

3. In combination with a brake shoe having a rim and a web, the rim being formed with sets of transversely spaced slots and the web being formed with openings; a lining disposed against the rim and formed with transverse recesses in its outer face and slots leading from the recesses for registering with the slots of the shoe, U-shaped clips having bridge portions countersunk in the recesses and arms passing through companion slots of the lining and the shoe, the arms of certain of said clips being formed with hook-shaped portions having interlocking engagement with portions of the rim to secure said clips against accidental displacement, the remaining clips having their arms formed with openings alined with openings of the web, and threaded fasteners passing through the alined openings and provided with nuts for preventing displacement of the fasteners.

4. In combination with a brake shoe having a rim and a web, the rim being formed with sets of transversely spaced slots and the web being formed with openings; a lining disposed against the rim and formed with recesses in its outer face and with slots leading from the recesses registering with the slots of the rim, clips countersunk in the recesses and having arms passing through the slots of the lining and the rim, certain of the clips having their arms interlocked with the rim, and fasteners passing through arms of the remaining clips and through the openings of the web and provided with locking members engaging the web to exert frictional binding and hold the fasteners against accidental displacement.

5. In combination with a brake shoe having a rim and a web, a lining disposed against the outer face of said rim, clips having portions countersunk in the outer face of said lining and arms passing through the lining and the rim, the arms of certain of the clips being interlocked with the rim, and fasteners passing through the arms of the remaining clips and through the web and provided with locking members for preventing accidental displacement of the fasteners.

6. In combination with a brake shoe having a rim and a web, a lining disposed against the outer face of said rim, clips having portions countersunk in the outer face of said lining and arms passing through the lining and the rim, the arms of certain of the clips being formed with openings alined with openings in the web, threaded fasteners passing through the alined openings and each having threaded engagement with the web and with one arm of the clip through which it passes, and nuts threaded upon the fasteners and tightened to exert binding grip to prevent accidental loosening of the fasteners.

WILLIAM F. MERRITT.